United States Patent [19]
Sunderman et al.

[11] Patent Number: 5,652,791
[45] Date of Patent: Jul. 29, 1997

[54] SYSTEM AND METHOD FOR SIMULATING OPERATION OF AN AUTOMATIC CALL DISTRIBUTOR

[75] Inventors: Kurt E. Sunderman, Geneva, Ill.; Robert J. Doyle, Newbury Park, Calif.; Roger A. Sumner, Batavia, Ill.

[73] Assignee: Rockwell International Corp., Seal Beach, Calif.

[21] Appl. No.: 504,158

[22] Filed: Jul. 19, 1995

[51] Int. Cl.$^6$ ............................................. H04M 3/00
[52] U.S. Cl. ................................. 379/265; 379/201
[58] Field of Search ..................... 364/578; 395/500; 379/265, 266, 201

[56] References Cited

PUBLICATIONS

Smith et al., "Why CASE should extend into software performance," Software Magazine, v10, n9, pp. 49–56 Jul. 1990.

*Primary Examiner*—Krista M. Zele
*Assistant Examiner*—Daniel S. Hunter
*Attorney, Agent, or Firm*—Welsh & Katz, Esq.

[57] ABSTRACT

A system (200) and method for simulating operation of an autonomic call distributor (100) is provided. The system (200) provides an indication of hardware resources, such as digit collector cards (120) and digital audio source cards (118), required for any given call volume and configuration of the automatic call distributor (100). The system (200) obtains system configuration data relating to the configuration of the automatic call distributor (100) from a user and/or by downloading the data from the automatic call distributor (100). Call traffic data relating to a desired call volume is similarly provided to the system (200). The system (200) simulates operation of the automatic call distributor (100) based on the system configuration and call traffic data and determines hardware resources required in the automatic call distributor (100) for the desired call volume based on the simulated operation of the automatic call distributor (100).

23 Claims, 4 Drawing Sheets

FIG. 4

RECEIVER GROUP STATUS REPORT

COVERING XXX SECONDS

| RECEIVER GROUP | FUNCTION | # OF PORTS | COMMON RCVRG # | # OF REQUEST | # OF REQUEST DELAYED ≥1 SEC | # OF REQUEST DELAYED >3 SEC | # OF REQUEST FAILED | MAX DELAY TIME | PCT ALL BUSY | AVG CNCT TIME | AVG UNAVAL |
|---|---|---|---|---|---|---|---|---|---|---|---|
| 1 RCVRG_1 | SCRDTMF | XX | 3 | XXXX | XXX | XXX | XXX | XX | XX | XX | XX |
| 2 RCVRG_2 | MAILDTMF | XX | 3 | XXXX | XXX | XXX | XXX | XX | XX | XX | XX |
| 3 COMMON | COMMON | XX | — | XXXX | XXX | XXX | XXX | XX | XX | XX | XX |
| TOTAL | | XX | | XXXX | XXX | XXX | XXX | XX | XX | XX | XX |

FIG. 5

TONE/ANNOUNCEMENT GROUP STATUS REPORT

COVERING XXX SECONDS

| TAG GROUP | FUNCTION | TAG TYPE | # OF PORTS | COMMON TAG # | # OF REQUEST | # OF REQUEST DELAYED >1 SEC | # OF REQUEST DELAYED >3 SEC | # OF REQUEST FAILED | MAX DELAY TIME | PCT ALL BUSY | AVG CNCT TIME | AVG UNAVAL |
|---|---|---|---|---|---|---|---|---|---|---|---|---|
| 1 GENANNOUNCE | TAPLAY | MULTI | XX | 4 | XXXX | XXX | XXX | XXX | XX | XX | XX | XX |
| 2 MAIL PROMPT | MAILDTMF | STRTSTP | XX | 4 | XXXX | XXX | XXX | XXX | XX | XX | XX | XX |
| 3 CALL BACK | CAREC | STRTSTP | XX | — | XXXX | XXX | XXX | XXX | XX | XX | XX | XX |
| 4 COMMON | COMMON | STRTSTP | XX | — | XXXX | XXX | XXX | XXX | XX | XX | XX | XX |
| TOTAL | | | XX | | XXXX | XXX | XXX | XXX | XX | XX | XX | XX |

SYSTEM AND METHOD FOR SIMULATING OPERATION OF AN AUTOMATIC CALL DISTRIBUTOR

BACKGROUND OF THE INVENTION

The present invention is related generally to automatic call distributor simulators and, more particularly, to a system and method for simulating an automatic call distributor to determine hardware resources required in the automatic call distributor for a desired call volume and automatic call distributor configuration.

Telephone switching systems employing automatic call distributors (ACD) are increasingly used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System", the disclosure of which is hereby incorporated by reference.

A typical ACD contains software-based vectors, or telescripts, for processing incoming telephone calls. Vectors are scripts of commands which define the actions which take place in processing a call within an ACD. The vectors collect digits entered by the caller, collect network information such as automatic number identification (ANI) information, dialed-number identification system (DNIS) information and the trunk group over which the incoming telephone call is received. Vectors also route the incoming telephone calls to agents and voice response units, play pre-recorded announcements to the caller, queue calls, route calls to another ACD and handle situations wherein the caller has entered incorrect digits.

Frequently, call center personnel wish to create or modify vectors to perform different or additional functions. In view of this, ACD manufacturers have made it relatively easy for call center personnel to create or edit the vectors for customized call processing. However, unexpected problems may result from such modifications or additions. Vectors, while syntactically correct, may not perform as the designer intended, or may have undesirable effects on other vectors.

Computer simulation programs for simulating ACD operation have been developed to provide a relatively easy and speedy way to evaluate the effects of modifications to existing vectors or additions of new vectors. The programs are provided with the existing vectors and the vectors are modified. Simulated incoming telephone calls, based on a defined call traffic definition such as call rate, call duration, call abandon rates and the like, are next routed through the vectors to imaginary agents and reports are generated representative of the operation of the simulated ACD. From the reports, areas which may create problems can be identified and corrected without modifying the actual vectors in the ACD.

Unfortunately, current simulation programs do not provide information from which required hardware resources for the given call frequency can be determined. For example, ACDs typically include one or more digit collector cards for collecting digital digits relating to an incoming telephone calls, such as the ANI information, DNIS information and digits entered by the caller. As will be apparent to those skilled in the art, the number of digit collector cards required in an ACD will depend on the configuration of the ACD and the call traffic definition.

Similarly, ACDs contain announcement cards for playing announcements to callers. The number of announcement cards required in an ACD will also be dependent upon the configuration of the ACD and the defined call traffic definition.

Accordingly, there is a need in the art for a system and method for simulating operation of an automatic call distributor which generates information indicating a required hardware resources, such as digit collector cards and announcement cards, for a particular ACD configuration and a defined call traffic definition.

SUMMARY OF THE INVENTION

This need is met by the system and method for simulating operation of an automatic call distributor wherein a required level of hardware resources, such as digit collector cards and announcement cards, is determined for a given ACD configuration and call traffic definition.

In accordance with one aspect of the present invention, a system for simulating operation of an automatic call distributor is provided. The system comprising inputting means for inputting operation data relating to the automatic call distributor and call data representative of a desired call traffic definition. Simulating means in the system simulates operation of the automatic call distributor based on the operation and call data received from the inputting means and indicates hardware resources required in the automatic call distributor for the desired call traffic definition based on the simulated operation of the automatic call distributor.

Preferably, the system comprises reporting means for selectively generating reports based on the simulated operation of the automatic call distributor. The simulating means may comprise call generator means for simulating incoming telephone calls to the automatic call distributor based on the desired call traffic definition; call distribution means for simulating routing of the incoming telephone calls through the automatic call distributor; and statistic compilation means for compiling selected simulation data relating to the incoming telephone calls routed by the call distribution means.

The call distribution means may comprise application vector means for simulating routing of the incoming telephone calls. Further, the call distribution means may comprise intercept vector means for simulating error situations in the automatic call distributor and for simulating routing of the incoming telephone calls in response to the error situations. For ease of use, the inputting means may comprise download means for electronically downloading at least a portion of the operation data from the automatic call distributor.

In accordance with another aspect of the present invention, a system for simulating operation of an automatic call distributor is provided. The system comprising inputting means for inputting operation data relating to the automatic call distributor and call data representative of a desired call traffic definition. Simulating means simulates operation of the automatic call distributor based on the data received from the inputting means and indicates a number of announcement cards required in the automatic call distributor for the desired call traffic definition based on the simulated operation of the automatic call distributor.

In accordance with yet another aspect of the present invention, a method for simulating operation of an automatic call distributor is provided. The method comprising the steps of: inputting operation data representative of operation of the automatic call distributor; inputting a desired call traffic definition; generating incoming telephone calls based on the desired call traffic definition; simulating operation of the automatic call distributor based on the operation data and desired call traffic definition; and indicating hardware resources required in the automatic call distributor for the desired call traffic definition based on the simulated operation of the automatic call distributor.

These and other features and advantages of the present invention will become apparent from the following detailed description, the accompanying drawings and the appended claims.

BRIEF DESCRIPTION OF THE DRAWINGS

FIG. 4 is an exemplary report generated by the system shown in FIG. 2 in accordance with the present invention; and FIG. 5 is an additional exemplary report generated by the system shown in FIG. 2 in accordance with the present invention.

DETAILED DESCRIPTION OF THE INVENTION

Figure 1:
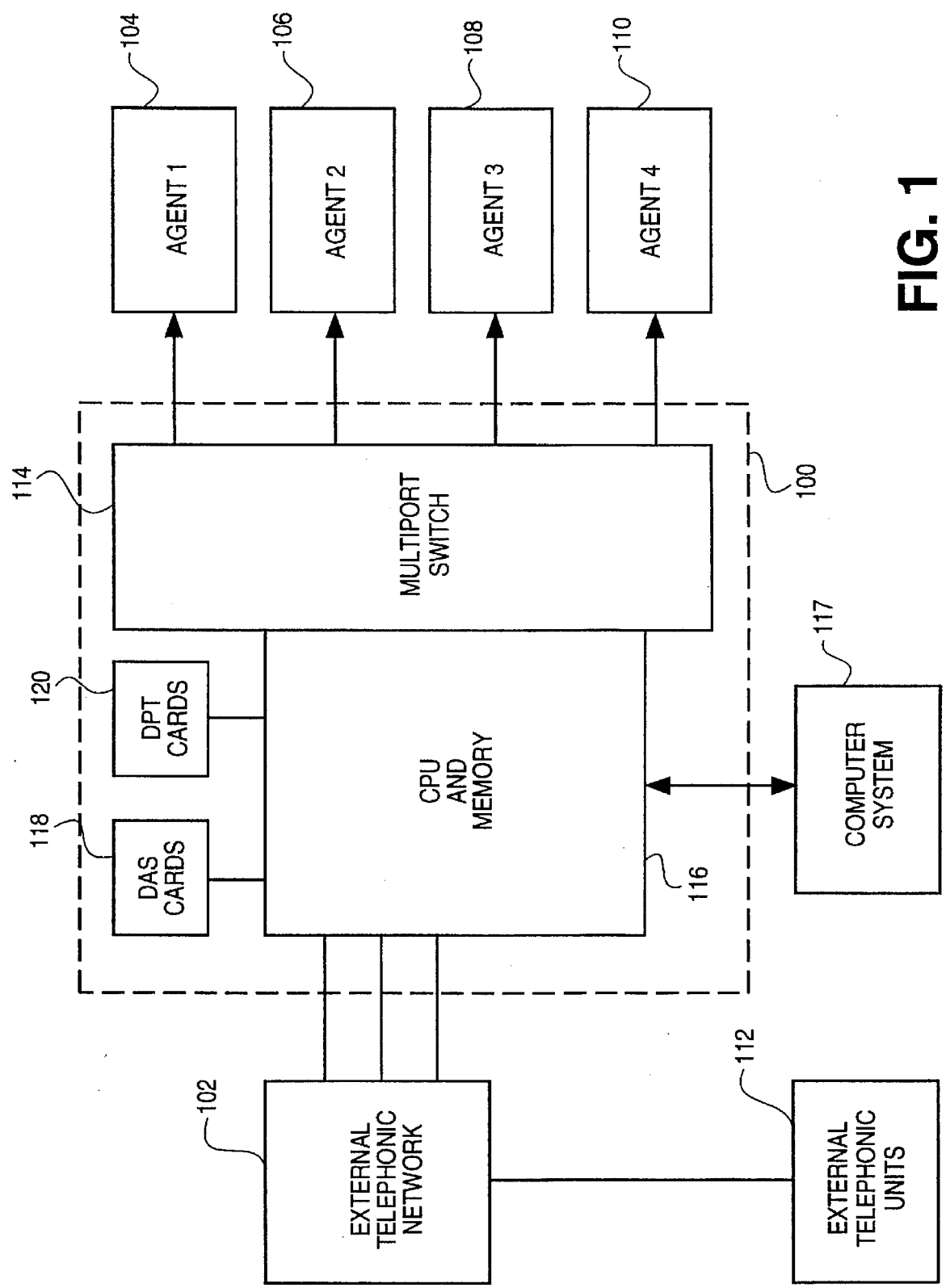
FIG. 1 is a schematic block diagram of an automatic call distributor for routing incoming telephone calls which is connected to an external telephonic network and a plurality of agents.

An automatic call distributor (ACD) 100 for routing incoming telephone calls received from an external telephonic network 102 to a plurality of agents 104, 106, 108 and 110 is shown in FIG. 1. The incoming telephone calls are made from external telephonic units 112 connected to the external telephonic network 102. The ACD 100 includes a multiport switch 114 for routing the incoming telephone calls under the control of a CPU and memory 116. A computer system 117 is connected to the CPU and memory 116 for receiving reports relating to the operation of the ACD 100, for modifying software in the CPU and memory 116 and other like functions. Automatic call distributors for routing incoming telephone calls to selected ones of a plurality of agents are well known. Examples of such ACDs are disclosed in U.S. Pat. No. 5,268,903, issued to Jones et at., entitled "Multichannel Telephonic Switching Network With Different Signaling Formats and Connect/PBX Treatment Selectable For Each Channel", issued on Dec. 7, 1993 and U.S. Pat. No. 5,140,611, issued to Jones et at., entitled "Pulse Modulated Self-Clocking and Self-Synchronizing Data Transmission and Method for a Telephonic Communication Switching System", issued on Aug. 18, 1992, the disclosures of which are hereby incorporated by reference.

The ACD 100 includes digital audio source (DAS) cards 118, or announcement cards, for generating tones and recorded announcements and digit collecting cards (DPT) cards 120 for collecting digits, such as dual tone multiple frequency (DTMF) tones, transmitted over the external telephonic network 102. The hardware resources, such as the number of DAS and DPT cards 118 and 120, required for a particular ACD 100 is dependent upon the volume of calls received by the ACD 100, the vectors in the ACD 100 and other characteristics of the ACD 100. Modifying the vectors in the ACD 100 may consequently result in changes in the required hardware resources, such as the number of DAS and DPT cards 118 and 120, for a given call volume. As noted, prior ACD simulators do not provide information relating to the level of hardware resources required for a desired call volume. ACD users must consequently use trial and error to achieve the appropriate level of hardware resources after making modifications to the vectors in the ACD.

Figure 2:
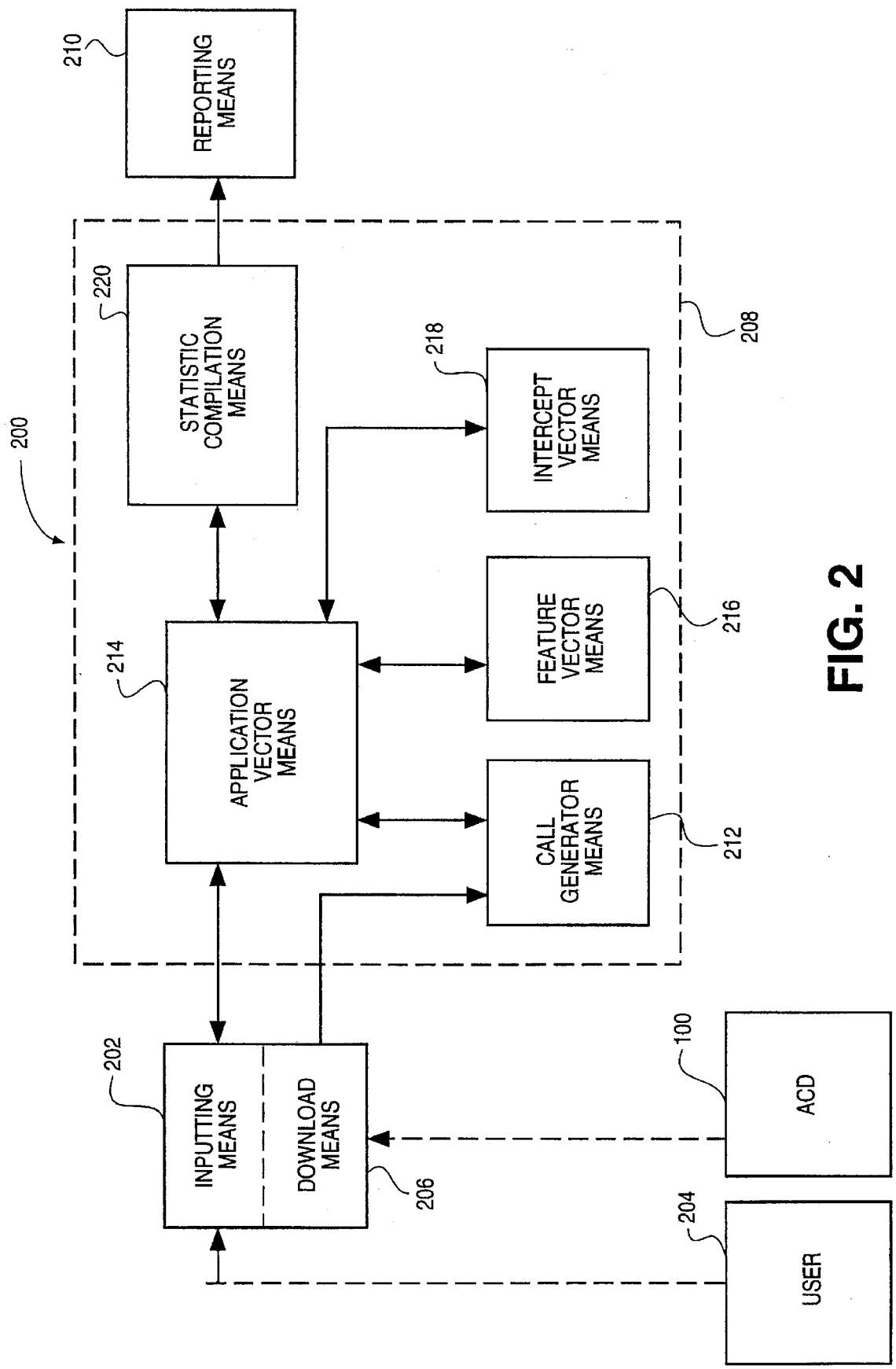
FIG. 2 is a schematic block diagram of a system for simulating operation of the automatic call distributor shown in FIG. 1 in accordance with the present invention.
Figure 3:
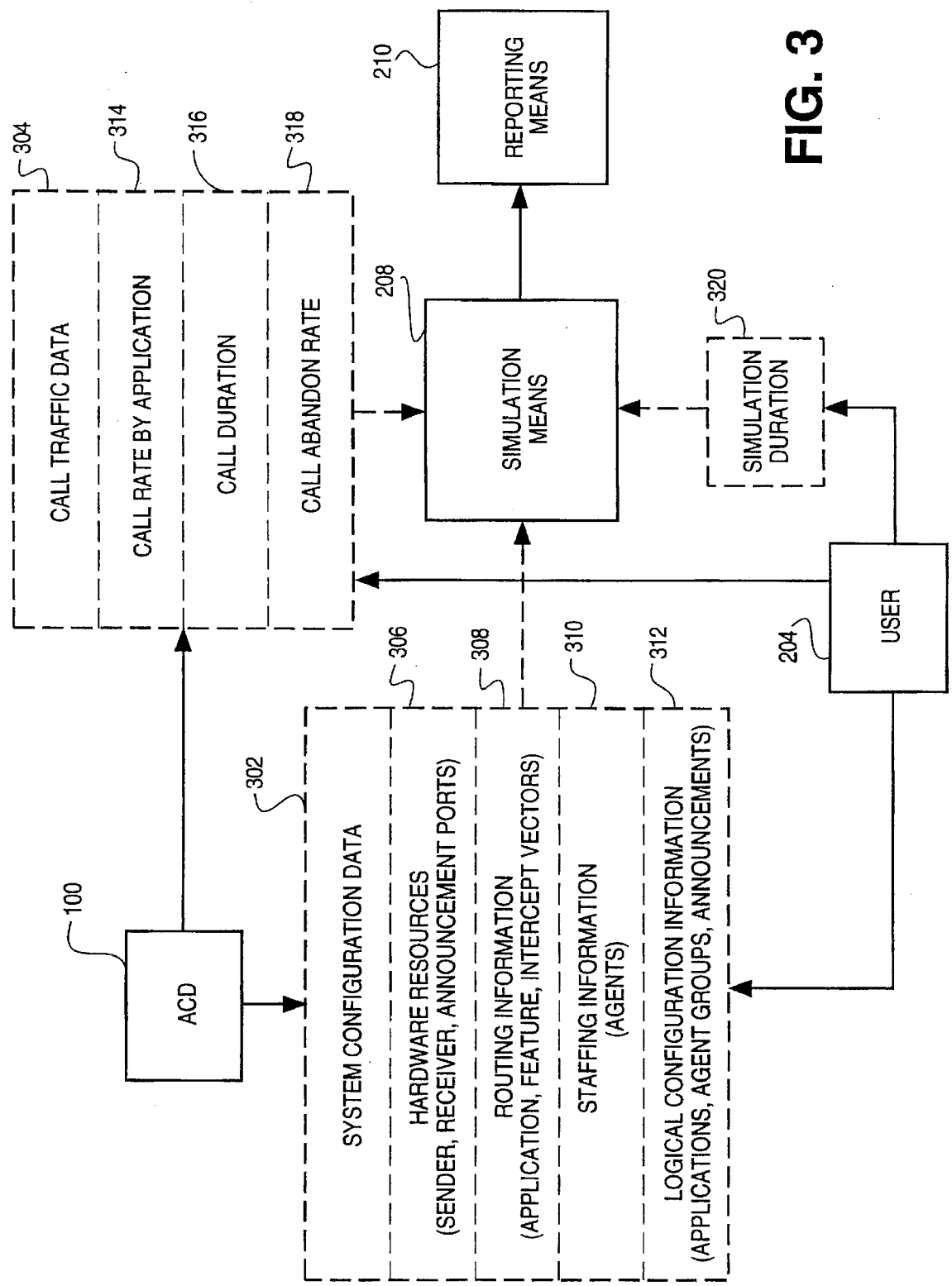
FIG. 3 is a schematic block diagram showing information being provided to the system in FIG. 2 in order to simulate operation of the automatic call distributor shown in FIG. 1.

The present invention advantageously provides the ACD user an indication of the hardware resources required for a desired call volume so that such wasteful trial and error is unnecessary. A schematic block diagram of a system 200 in accordance with the present invention is shown in FIG. 2. A further block diagram is provided in FIG. 3 which shows information being provided to the system 200 in FIG. 2 in order to simulate operation of the ACD 100. Inputting means 202 provides for inputting system configuration data 302 relating to the configuration of the ACD 100 and call traffic data 304 relating to a desired call volume in the ACD 100. The system configuration data 302 and call traffic data 304 are provided to the inputting means 202 by a user 204 or by electronically downloading at least a portion of the data 302 and 304 from the ACD 100 via download means 206. Means for downloading data are well known to those skilled in the art and, therefore, will not be further described herein.

The system configuration data 302 may comprise, for example, hardware resources 306, including routing information 308, staffing information 310, and logical configuration information 312. The hardware resources 306 may comprise the configuration of sender, receiver and announcement ports. The routing information 308 may comprise, for example, application vectors, feature vectors and intercept vectors. A number of agents may be included in the staffing information 310. The logical configuration information 312 may include configuration of various applications, agent group configuration and announcement formats. As will be readily apparent to those skilled in the art, this information generally describes the configuration of the ACD 100. It should be understood that other information describing the configuration of the ACD 100 may be included in the system configuration data 302; however, for clarity and ease of description, additional information will not be further discussed.

The call traffic data 304 may comprise, for example, a call rate by application 314, a call duration 316 and a call abandon rate 318. The call rate by application 314 is representative of the rate of calls arriving at the ACD 100 which are of a particular type or, in other words, are routed by a particular application. The call duration 316 is the average length of each call and call abandon rate 318 is representative of the rate of calls which are abandoned without reaching an agent. Each of these data categories may be further subdivided for particular types of calls or other criteria. The system configuration data 302 and the call traffic data 304 is provided to simulation means 208 which preferably comprises a programmable microprocessor or computer.

Preferably, the user 204 provides a simulation duration 320 to the simulation means 208 indicating over what length of time the simulation means 208 is to simulate ACD 100 operation. Alternatively, a default simulation duration is provided in instances where the user 204 does not indicate a specific length of time. Reporting means 210 selectively generates reports based on the simulated operation of the ACD 100. As will be readily apparent to those skilled in the art, reporting means 210 may be comprised of any of a number of devices, such as a printer, a computer terminal with an electronic display and the like.

The above information is provided to the simulation means 208 for simulating operation of the ACD 100. The simulation means 208 comprises call generator means 212 for simulating incoming telephone calls to the ACD 100 based on the desired call volume. The call generation means 212 preferably initiates calls at random intervals. Typically, a call will be characterized by four statistical properties: call inter arrival time, call talk time, agent work time and time to abandon. The call inter arrival time, call talk time, agent work time and time to abandon are determined by common statistical distributions.

Call distribution means, which comprises application vector means 214, feature vector means 216 and intercept vector means 218, for simulating routing of the incoming telephone calls from the call generator means 212 through the ACD 100. Statistic compilation means 220 compiles selected simulation data relating to the incoming telephone calls routed by the call distribution means and transmits the simulation data to the reporting means 210.

Within the call distribution means, the application vector means 214 simulates routing of the incoming telephone calls to agents through variously defined applications. As is well known in the art, applications are related to the type of calls, such as, for example, airline reservations, catalog sales and telemarketing. The intercept vector means 218 simulates errors situations in the ACD 100 and simulates routing of the incoming telephone calls in response to the error situations. Error situations may occur, for example, when a caller is prompted by the ACD 100 to enter a three digit code and only enters two digits. As will be readily comprehended by those skilled in the art, the system configuration data 302 is used by the simulation means 208 to simulate the ACD 100.

Advantageously, the present invention indicates a level of hardware resources required for a particular call volume and ACD configuration. In particular, the simulation means 208 reports on the sender, receiver and announcement ports used during the simulation. For example, the simulation means 208 may report on the number of times a request to use each of ports was denied because all of that particular type of port were busy or the number of calls which failed because all of that particular type of port was busy. The above numbers may further be presented in percentages or any other known format.

In particular, the system 100 of the present invention simulates the operation of hardware resources which may be subject to contention. These hardware resources include, for example, digit collectors (DPT cards), ACD mail callback recorders and general delay announcements and mail prompts (created by the DAS cards). In the preferred embodiment of the present invention, the digit collectors are combined into Receiver Groups and the DAS cards are combined into Tone/Announcement Groups.

Exemplary status reports for Receiver Groups and the Tone/Announcement Groups are shown in FIGS. 4 and 5. The Receiver Group Status Report 400 shows a length of time 402 over which the simulation was run. Three receiver groups, RCVRG_1, RCVRG_2 and Common, are listed in the Receiver Group column 404 of the report 400. The function of each group is shown in column 406. A Function column 406 lists a function type for each of the receiver groups. The RCVRG_1 group has a function type designated SCRDTMF meaning that the group collects digits manually inputted by the caller. The RCVRG_2 group has a function type designated MAILDTMF indicating that the group collects digits relating to the ACD mail function and the Common groups has a function type designated COMMON meaning that the group collects digits when the other groups are busy. Column 408 lists the number of ports associated with each of the receiver groups and a total number of ports. As will be apparent to those skilled in the art, the number of ports will be directly proportional to the number of DPT cards 120 in each group.

An identifying number representative of the Common receiver group is listed in column 410. In this example, the Common group is designated as "3". Column 412 contains a list of the number of requests received by each of the receiver groups. The number of requests which had to be delayed more than one (1) second because the receiver groups were unable to immediately handle the requests are listed in column 414. The number of requests which were delayed more than three (3) seconds for each group are listed in column 416.

The number of requests which ultimately were not serviced are listed in column 418. Requests may be considered failed if they are delayed beyond a defined time limit. For example, requests which are delayed beyond ten (10) seconds may be considered failed for some purposes. The defined time limit is preferably selected by the user 204.

A maximum delay time in servicing a request for each group is listed in FIG. 420. When a request exceeds the maximum delay time, it may be considered failed or other action may be taken. Column 422 fists the percentage of time during which all ports in the respective groups were busy. The average connect time to each of the groups is listed in column 424. Finally, the average number of ports in use during the simulation is listed for each group in column 426.

Similar information is reported in the Tone/Announcement Group (TAG) Status Report 500 shown in FIG. 5. A length of time 502 over which the simulation was run is reported. GenAnnounce, MailPrompt, CallBack and Common are TAG groups listed in column 504. Column 506 lists the function of each of the TAG groups. These functions include TAPLAY, MAILDTMF, CAREC and COMMON. TAPLAY indicates that the GenAnnounce group records and plays back tones and system announcements, MAILDTMF indicates that this group generates tones and/or announcements for the ACD mail system, CAREC indicates that the group records and transmits call back announcements and COMMON indicates that the group is used for overflow from the other groups. The TAG type for each of the TAG groups is listed in column 508. The TAG types listed include MULTI indicating that the TAG group consists of multiple ports dedicated to one tone/announcement and STRTSTP indicating that the each port of the TAG group is shared by several tones/announcements and played to one caller at a time.

The number of ports for each TAG group is listed in column 509. The number of the Common TAG is listed in column 510. The number of requests made to each of the TAG groups during the simulation is listed in column 512. A list of the number of such requests which were delayed longer than one (1) second is given in column 514. Columns 516 and 518 contain lists of the number of requests which were delayed longer than three (3) seconds and the number of requests which failed, respectively. The maximum delay time for each TAG group over which a request is considered failed is listed in column 520. Columns 522, 524 and 526 contain lists of the percentage of time that all ports were busy, the average connect time and the average number of ports in use, respectively.

It should be again noted that the data reported in FIGS. 4 and 5 are shown for purely exemplary purposes to aid in the description of the present invention. As one skilled in the art will readily comprehend, the extensive data contained in the above reports provided sufficient information to readily determine the number of DAS and DPT cards required for a particular call volume and ACD configuration.

Having thus described the invention in detail by way of reference to preferred embodiments thereof, it will be apparent that other modifications and variations are possible without departing from the scope of the invention defined in the appended claims. For example, the reports may have design configurations which depart from those described herein.

What is claimed is:

1. A system for simulating operation of an automatic call distributor, the system comprising:

inputting means for inputting system configuration data relating to the automatic call distributor and call traffic data relating to a desired call volume; and simulating means for simulating operation of the automatic call distributor based on the system configuration and call traffic data received from the inputting means;

the simulating means configured to indicate hardware resources required in the automatic call distributor for the desired call volume based on the simulated operation of the automatic call distributor;

the indication of hardware resources required based upon simulated usage of sending/receiving devices in the automatic call distributor, and based upon simulated response times of the sending/receiving devices relative to a predetermined desired response time.

2. The system as recited in claim 1 comprising reporting means for selectively generating reports based on the simulated operation of the automatic call distributor.

3. The system as recited in claim 1 wherein the simulating means comprises:

call generator means for simulating incoming telephone calls to the automatic call distributor based on the desired call volume;

call distribution means for simulating routing of the incoming telephone calls through the automatic call distributor; and static compilation means for compiling selected simulation data relating to the incoming telephone calls routed by the call distribution means;

the selected simulation data including at least an indication of sending/receiving port usage corresponding to the sending/receiving devices, and an indication of a response delay time corresponding to the sending/receiving ports.

4. The system as recited in claim 3 comprising reporting means for selectively generating reports based on the simulation data compiled by the statistic compilation means.

5. The system as recited in claim 3 wherein the call distribution means comprises application vector means for simulating routing of the incoming telephone calls.

6. The system as recited in claim 5 wherein the call distribution means comprises intercept vector means for simulating error situations in the automatic call distributor and for simulating routing of the incoming telephone calls in response to the error situations.

7. The system as recited in claim 1 wherein the inputting means comprises download means for electronically downloading at least a portion of the system configuration data from the automatic call distributor.

8. The system as recited in claim 3 wherein the indication of response delay time for the sending/receiving ports includes an indication of a number of times a request to use the ports was delayed by more than a predetermined amount of time.

9. A system for simulating operation of an automatic call distribution, the system comprising:

inputting means for inputting system configuration data relating to the automatic call distributor and call traffic data representative of a desired call volume; and simulating means for simulating operation of the automatic call distributor based on the data received from the inputting means;

the simulating means configured to indicate a number of announcement cards required in the automatic call distributor for the desired call volume based on the simulated operation of the automatic call distributor;

the indication of the number of announcement cards required based upon simulated usage of the announcement cards in the automatic call distributor, and based upon simulated response times of the announcement cards relative to a predetermined desired response time.

10. The system as recited in claim 9 comprising reporting means for selectively generating reports based on the simulated operation of the automatic call distributor.

11. The system as recited in claims 9 wherein the simulating means comprises:

call generator means for simulating incoming telephone calls to the automatic call distributor based on the desired call volume;

call distribution means for simulating routing of the incoming telephone calls though the automatic call distributor; and statistic compilation means for compiling selected simulation data relating to the incoming telephone calls routed by the call distribution means;

the selected simulation data including at least an indication of the announcement card usage, and an indication of response delay time corresponding to the announcement cards.

12. The system as recited in claim 11 comprising reporting means for selectively generating reports based on the data compiled by the statistic compilation means.

13. The system as recited in claim 11 wherein the call distribution means comprises application vector means for simulating routing of the incoming telephone calls to agents.

14. The system as recited in claim 13 wherein the call distribution means comprises intercept vector means for simulating error situations in the automatic call distributor and for simulating routing of the incoming telephone calls in response to the error situations.

15. The system as recited in claim 9 wherein the inputting means comprises download means for electronically downloading at least a portion of the data from the automatic call distributor.

16. The system as recited in claim 11 wherein the indication of response delay time for the announcement cards includes an indication of a number of times a request to use the announcement cards was delayed by more than a predetermined amount of time.

17. A method for simulating operation of an automatic call distributor comprising the steps of:

inputting system configuration data representative of operation of the automatic call distributor;

inputting a desired call traffic configuration relating to a desired call volume;

generating incoming telephone calls based on the desired call traffic configuration and the desired call volume;

simulating operation of the automatic call distributor based on the system configuration data, the desired call traffic configuration, and desired call volume; and providing an indication of hardware resources required in the automatic call distributor for the desired traffic configuration and the desired call volume based on the simulated operation of the automatic call distributor, the indication of hardware resources required based upon simulated usage of sending/receiving devices in the automatic call distributor, and based upon simulated response times of the sending/receiving devices relative to a predetermined desired response time.

18. The method as recited in claim 17 wherein the step of determining hardware resources comprises the step of determining digit collector cards required in the automatic call distributor for the desired call volume based on the simulated operation of the automatic call distributor.

19. The method as recited in claim 17 wherein the step of inputting system configuration data comprises the step of electronically downloading at least a portion of the system configuration data from the automatic call distributor.

20. The method as recited in claim 17 wherein the step of determining hardware resources comprises the step of determining announcement cards required in the automatic call distributor for the desired call volume based on the simulated operation of the automatic call distributor.

21. The method as recited in claim 20 comprising the step of selectively generating reports based on the simulated operation of the automatic call distributor.

22. The method as recited in claim 20 comprising the steps of:

simulating incoming telephone calls to the automatic call distributor based on the desired call volume;

simulating routing of the incoming telephone calls through the automatic call distributor; and compiling selected simulation data relating to the incoming telephone calls routed by the call distribution means, the selected simulation data including an indication of the sending/receiving device usage and an indication of a response delay time corresponding to the sending/receiving devices.

23. The method as recited in claim 22 wherein the indication of response delay time for the sending/receiving devices includes an indication of a number of times a request to use the sending/receiving devices was delayed by more than a predetermined amount of time.

* * * * *